United States Patent
May

(10) Patent No.: US 10,444,096 B2
(45) Date of Patent: Oct. 15, 2019

(54) DISTANCE COMPENSATION

(71) Applicant: Torque And More (TAM) GmbH, Starnberg (DE)

(72) Inventor: Lutz May, Berg (DE)

(73) Assignee: Torque and More (TAM) GmbH, Starnberg (DE)

( * ) Notice: Subject to any disclaimer, the term of this patent is extended or adjusted under 35 U.S.C. 154(b) by 0 days.

(21) Appl. No.: 15/580,196

(22) PCT Filed: Jun. 10, 2016

(86) PCT No.: PCT/EP2016/063384
§ 371 (c)(1),
(2) Date: Dec. 6, 2017

(87) PCT Pub. No.: WO2016/198658
PCT Pub. Date: Dec. 15, 2016

(65) Prior Publication Data
US 2018/0180499 A1   Jun. 28, 2018

(30) Foreign Application Priority Data

Jun. 10, 2015 (EP) ..................................... 15171502

(51) Int. Cl.
*G01L 3/10* (2006.01)
*G01L 1/14* (2006.01)

(52) U.S. Cl.
CPC ............... *G01L 3/105* (2013.01); *G01L 1/142* (2013.01)

(58) Field of Classification Search
CPC . G01L 3/101; G01L 3/105; G01L 1/00; G01L 1/12; G01L 1/142

USPC ...................................... 73/862.331–862.338
See application file for complete search history.

(56) References Cited

U.S. PATENT DOCUMENTS

| 4,805,463 A * | 2/1989 | Kelledes | B62D 15/02 336/30 |
| 4,976,160 A * | 12/1990 | Dobler | G01L 3/102 73/779 |
| 7,071,657 B2 * | 7/2006 | Tupper | H02K 31/02 310/166 |
| 7,270,017 B2 * | 9/2007 | Suzuki | G01L 3/1457 73/862.193 |
| 8,564,281 B2 * | 10/2013 | Filatov | G01B 7/003 324/207.17 |
| 9,134,188 B2 * | 9/2015 | May | G01L 1/127 |
| 9,410,929 B2 * | 8/2016 | Endo | G01N 27/82 |

(Continued)

FOREIGN PATENT DOCUMENTS

JP   S618639   1/1986
JP   S618639 A * 1/1986

*Primary Examiner* — Octavia Hollington
(74) *Attorney, Agent, or Firm* — Fay Kaplun & Marcin, LLP

(57) ABSTRACT

A sensor device for sensing a torque being applied to an object is provided. The sensor device comprises a first inductance arrangement having a first coil with a corresponding main sensing direction and a capacitance arrangement. The capacitance arrangement together with the first inductance arrangement forms a resonant circuit having a corresponding resonance frequency. The first coil is oriented so as to have the corresponding main magnetizing directions oriented toward an object to be sensed.

5 Claims, 7 Drawing Sheets

(56) References Cited

U.S. PATENT DOCUMENTS

| | | | |
|---|---|---|---|
| 9,945,653 B2* | 4/2018 | Howard | G01B 7/003 |
| 2011/0308330 A1* | 12/2011 | May | B66B 1/3492 |
| | | | 73/862.69 |

* cited by examiner

DISTANCE COMPENSATION

TECHNICAL FIELD

The present description relates to force measurement and in particular to a sensor device for sensing a torque being applied to an object.

TECHNICAL BACKGROUND

Force measuring is important for many industrial applications, in particular for arrangements being dynamically impacted by a force. Applied forces may be pressure forces or loads as well as moments like torque and bending impact. An exemplary application for torque is a shaft for a vehicle being arranged between a motor and e.g. a wheel.

For determining a torque in the shaft, typically either a particular element needs to be mounted to the shaft, or the shaft needs to be pre-processed, e.g. magnetized. Mounting elements to a shaft may influence the movement of the shaft, pre-processing may be difficult when the shaft is not accessible or cannot me dismounted for pre-processing Alternatively, devices which do not require preprocessing of the shaft may be used for measuring a force applied to an object (also referred to as test object). Such devices comprise a magnetic field generating device and a magnetic field sensing device. The magnetic field generating device generates a magnetic field the magnetic flux lines of which are influenced by the object. If a load or a force is applied to the respective object, the influence of the object to the magnetic flux lines will alter compared to the unloaded condition of the object. The magnetic field sensing device is used to detect the magnetic field. The forces applied to the object can be determined based on the magnetic flux lines of the detected magnetic field.

BRIEF SUMMARY

One of the attractive features of the non-contact and magnetic principle based sensing technology is that the sensing device can be approached from one side to the surface of the test object from which the measurements have to be taken. But when trying to take mechanical force measurements from one side only (with a single point sensing device), then changing the distance between the sensing device and the surface of the test object will have an influencing factor of the achievable measurement performance. Typically, the shorter the distance between the sensing device and the surface of the test object, the better the measurement signal quality will be, for example the higher the amplitude of a measurement signal might be. In other words, it has been recognized that the distance between the test object and either one or both of the sensing device and the generating device has an influence on the signal detected by the sensing device. Therefore, the signal strength, which may be an indicator for the applied force, may unintentionally vary and thus lead to an adulterated measurement value.

There may be a need to provide a magnetic principle based mechanical force sensing technology which allows for compensation of variations in distance between the test object and the sensing device, i.e., either one or both of sensing and generating device.

According to a first aspect, a sensor device for sensing a torque being applied to an object is provided. The sensor device comprises a first inductance arrangement having a first coil with a corresponding main sensing direction and further comprises a capacitance arrangement. The capacitance arrangement together with the first inductance arrangement forms a resonant circuit having a corresponding resonance frequency, which may be defined by the dimensioning of the respective components, i.e., of the first inductance arrangement and the capacitance arrangement. The first coil is oriented so as to have the corresponding main magnetizing directions oriented toward an object to be sensed.

Simply speaking, the distance between the first coil and the test object may influence the total inductivity of the arrangement, i.e., the first coil together with the test object. This behavior may lead to the adulterated measurement signal as a result of the varied distance. The capacitance arrangement together with the first inductance arrangement forms an LC circuit. The resonance frequency of this LC circuit is defined by the specification inductivity and the capacity of the components. As the overall inductivity is affected by the distance between test object and inductance arrangement, this parameter also influences the resonance frequency referred to above. Changes in the resonance frequency due to distance variation can be compensated by the capacitance arrangement.

According to an embodiment, the sensor device further comprises a magnetic field generator being capable of generating a magnetic flux in the object to be sensed, such that a variation of the torque applied to the object results in a variation of the signal strength of a signal over the first inductance arrangement.

According to a further embodiment, the sensor device further comprises a flux concentrator with a first leg and a second leg, wherein the magnetic field generator comprises a coil, wherein the first coil is wound around the first leg and the coil of the magnetic field generator is wound around the second leg.

According to a further embodiment, the magnetic field generator comprises a capacitance, wherein the capacitance and the coil of the magnetic field generator form a resonant circuit having a corresponding resonance frequency.

According to a further embodiment, the sensor device further comprises a driving unit being connectable to the magnetic field generator, wherein the driving unit is adapted to drive the magnetic field generator with an operation frequency being shifted with respect to at least one of the resonance frequency of the resonance circuit formed by the first inductance arrangement and the capacitance arrangement and the resonance frequency of the resonance circuit formed by the coil and the capacitance of the magnetic field generator at a predefined distance between the sensor device and the object to be sensed.

According to a further embodiment, the shift of the operation frequency of the driving unit with respect to the resonance frequency is set up, such that when varying the distance between the sensor device and the object, a change of the resulting signal due to a changed distance is compensated by a change of the resulting signal due to a change of the resonance frequency.

According to a further embodiment, the shift of the of the operation frequency of the driving unit with respect to the resonance frequency is set up, such that for a predetermined distance variation range the bending characteristic of the resonance frequency characteristic corresponds to the bending characteristic of the distance versus signal strength characteristic, wherein a required amplification factor for compensation is set up by varying the quality factor of the resonance circuit.

According to another aspect, a sensor device for sensing a torque being applied to an object is provided. The sensor device comprises a first inductance arrangement having a first coil with a corresponding main sensing direction and a magnetic field generator being capable of generating a magnetic flux in the object to be sensed, such that a variation of the torque applied to the object results in a variation of the signal strength of a signal over the first inductance arrangement. The first coil is oriented so as to have the corresponding main magnetizing directions oriented toward an object to be sensed. The magnetic field generator comprises a coil and a capacitance, wherein the capacitance and the coil of the magnetic field generator form a resonant circuit having a corresponding resonance frequency.

Similar to what has been described above with reference to the first aspect, a resonance circuit may be built up not only with the sensing coil of the sensing device but also with the coil of the magnetic field generator. The capacitance and the coil of the magnetic field generator form a resonant circuit which has a similar effect in respect of compensating variations of the distance between the sensing device and the test object.

According to an embodiment, the sensor device further comprises a flux concentrator with a first leg and a second leg, wherein the first coil is wound around the first leg and the coil of the magnetic field generator is wound around the second leg.

According to a further embodiment, the sensor device further comprises a driving unit being connectable to the magnetic field generator, wherein the driving unit is adapted to drive the magnetic field generator with an operation frequency being shifted with respect to the resonance frequency of the resonance circuit formed by the coil and the capacitance of the magnetic field generator at a predefined distance between the sensor device and the object to be sensed.

According to a further embodiment, the shift of the operation frequency of the driving unit with respect to the resonance frequency is set up, such that when varying the distance between the sensor device and the object, a change of the resulting signal due to a changed distance over the predefined distance between the sensor device and the object to be sensed is compensated by a change of the resulting signal due to a change of the resonance frequency.

According to a further embodiment, the shift of the of the operation frequency of the driving unit with respect to the resonance frequency is set up, such that for a predetermined distance variation range the bending characteristic of the resonance frequency characteristic corresponds to the bending characteristic of the distance versus signal strength characteristic, wherein a required amplification factor for compensation is set up by varying the quality factor of the resonance circuit.

BRIEF DESCRIPTION OF THE DRAWINGS

In the following exemplary embodiments are described in more detail with reference to the enclosed drawings, in which FIG. 1 schematically shows a sensor device according to an exemplary embodiment.

DETAILED DESCRIPTION

Figure 1:
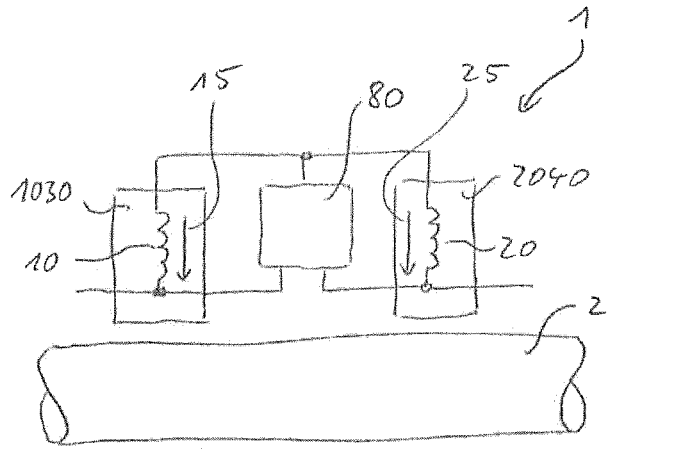

FIG. 1 shows a sensor device 1 for sensing a torque being applied to an object 2. The sensor device 1 comprises a first inductance arrangement 1030 having a first coil 10 with a corresponding main sensing direction 15. The sensor device 1 further comprises a second inductance arrangement 2040 having a second coil 20 with a corresponding main sensing direction 25. The sensor device 1 further comprises a capacitance arrangement 80. The first inductance arrangement 1030 and the second inductance arrangement 2040 are interconnected and the capacitance arrangement 80 is connected such with the inductance arrangements 1030 and 2040 that it forms together with the first inductance arrangement 1030 and the second inductance arrangement 2040 at least one resonant circuit having a specific resonance frequency. The first coil 10 and the second coil 20 are oriented so as to have the same main magnetizing directions 15, 25 oriented toward the test object 2. The first coil 10 and the second coil 20 are connected in anti-series with respect to the corresponding main sensing directions 15, 25, in particular such that in a homogenous magnetic field applied to the first coil 10 and the second coil 20 results in an at least partially compensation of signals at the first coil and the second coil, leading to a resulting signal over the first inductance arrangement and the second inductance arrangement.

Figure 2:
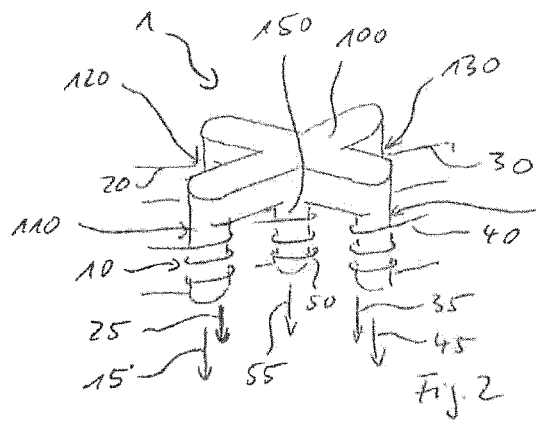
FIG. 2 schematically shows a sensor device according to an exemplary embodiment.
Figure 3:
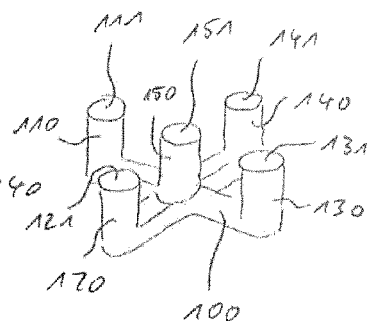
FIG. 3 schematically shows a sensor device according to an exemplary embodiment.

FIGS. 2 and 3 each show an isometric representation of a sensor device 1 comprising a flux concentrator 100. As can be seen in more detail in FIG. 3, the flux concentrator 100 comprises five legs 110, 120, 130, 140, 150 each of which has a respective end face 111, 121, 131, 141, 151. Four of the five legs (may be referred to as outer legs) are positioned substantially at the corners of a rectangle while the fifth leg (may be referred to as inner leg) positioned in the center of this virtual rectangle.

As can be seen in FIG. 2, four coils 10, 20, 30, 40 are wound around the outer legs, respectively. These four coils may particularly be sensing coils adapted to detect a magnetic field applied to the sensing coils and the strength of said magnetic field. Therefore, each of the coils 10, 20, 30, 40 is arranged such that its main sensing direction 15, 25, 35, 45 is directed toward the end faces of the respective leg and, more particularly, to the test object which is not shown in FIGS. 2 and 3.

In FIG. 2, there is also shown a magnetic field generator 50, which is a coil in this example having a main generator magnetic field direction 55 directed towards the test object.

With reference to FIGS. 2 and 3, the basic design of the sensing technology referred to herein shall be described in greater detail.

Basically, a sensor system consists of a sensing module (generator and sensor coils, for example) and the sensor electronics (driving unit or control unit). Such a sensor system may be referred to as an active mechanical force sensor, as the sensor system actively generates the magnetic field which is used for measuring the forces applied to the test object. The sensing module will be placed nearest to the test object from where mechanical force measurements have to be taken from. The test object can be a solid beam, a hollow tube, or a solid shaft like a power transmission shaft or a gearbox shaft, for example. The sensor electronics can be placed together with the sensing module in one and the same housing or these components can be remote from each other.

The general function of an active mechanical force sensor is that the sensing module (i.e., sensor device) has to emit a known magnetic field that will penetrate the surface of the test object, which preferably is a ferromagnetic test object, and then to measure specific physical parameters of the returning magnetic field or of the magnetic field being influenced by the test object. The physical parameters of the magnetic field that is coming back from the ferromagnetic test object will he changed by the mechanical stresses that are applied to the test object. The physical parameters of the returning magnetic field may also be influenced by some environmental operational conditions, like the temperature and the distance between the test object and the sensing module.

The sensing technology described herein allows measuring mechanical forces that are applied to a ferromagnetic test object, like torque, bending, and axial load. The physical design of the sensing module and the operational orientation of the sensing module (in relation to the main axis or longitudinal axis of the test object) decide about what force will be measured.

It has been recognized that without any distance compensation (distance between the sensing module and the test object, in particular between the end faces of the flux concentrator's legs and the test object or, in general, between the test object and the sensor and generator coils) the amplitude of the received carrier signal (coming back from the test object) will decrease when the spacing (distance between the sensing module and the test object surface) is increasing. The reason for this to happen is that the generated magnetic field (which is generated by the generator coil) is no longer channeled efficiently by the ferromagnetic material of the test object back into the sensing module. Instead, an increasing amount of magnetic field is getting back into the sensing module uncontrolled and is no longer coming back from the test object. When applying one of the possible signal recovery process, namely amplitude demodulation, then this variation in distance will lead into a change (increase) of the signal offset at the sensor electronics output.

When reducing the spacing (distance) between the sensing module and the test object then nearly all of the emanated magnetic field (generated by the generator coil) will follow the desired path back into the flux concentrator of the receiving part (inside the sensing module). Consequently, the amount of uncontrolled magnetic stray field is decreasing and with this, so is the signal offset.

Figure 4:
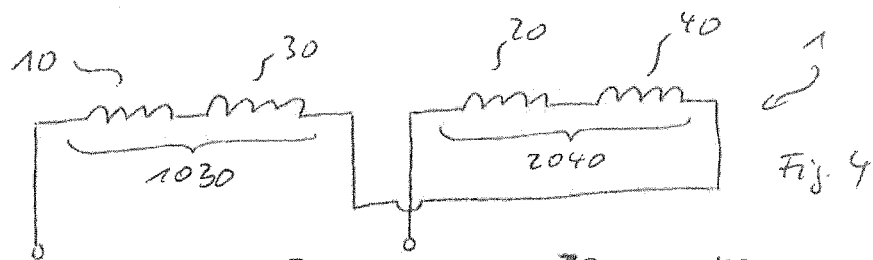
FIG. 4 schematically shows a sensor device according to an exemplary embodiment.

FIG. 4 schematically shows the interconnection of coils 10, 20, 30, 40 which are already shown in FIG. 2. The coils 10, 30 are connected in series as to form a first inductance arrangement 1030 and the coils 20, 40 are connected in series as to form a second inductance arrangement 2040. The inductance arrangements 1030 and 2040 are connected in anti-series.

Figure 5:
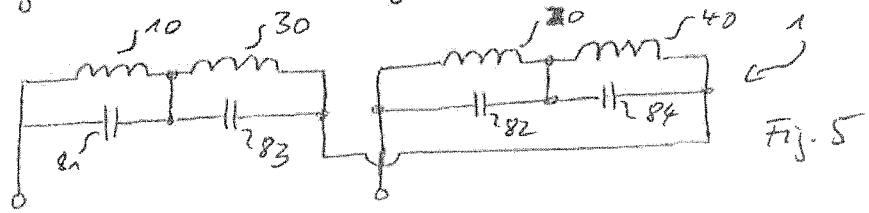
FIG. 5 schematically shows a sensor device according to an exemplary embodiment.

FIG. 5 shows the coil arrangement already shown in FIG. 4 with additional capacitance arrangements 81, 82, 83, 84. Capacitance arrangements 81, 83 are assigned to the coils 10, 30 of the first inductance arrangement, wherein one capacitance is connected parallel to one of the coils 10, 30, respectively. The capacitance arrangements 82, 84 are assigned to the second inductance arrangement and are connected similar to what has been described with reference to the first inductance arrangement.

Figure 6:
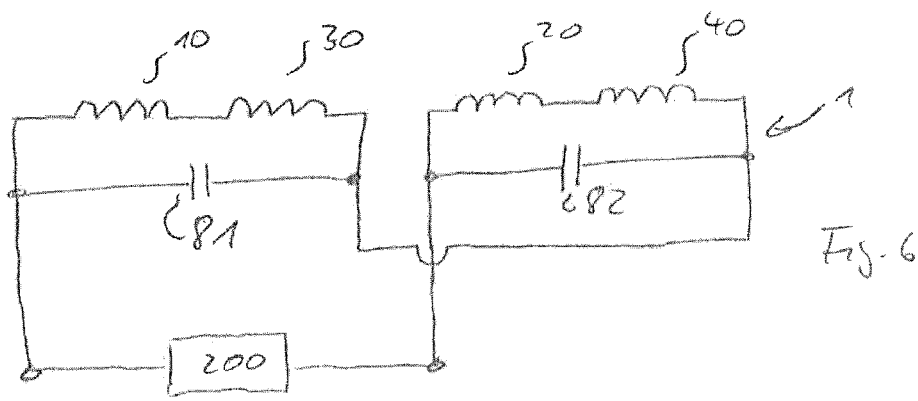
FIG. 6 schematically shows a sensor device according to an exemplary embodiment.

FIG. 6 shows an alternative example to FIG. 5. Each of the inductance arrangements may comprise one capacitance arrangement 81, 82 only, while the respective capacitance arrangement is connected in parallel to both coils of each of the inductance arrangements.

In FIG. 6, a driving unit 200 is shown which is connected to the connection lines of the sensing arrangement (both inductance arrangements 1030, 2040) in order to determine the distance to the test object based on the values sensed by the coils 10, 30, 20, 40.

Figure 7:
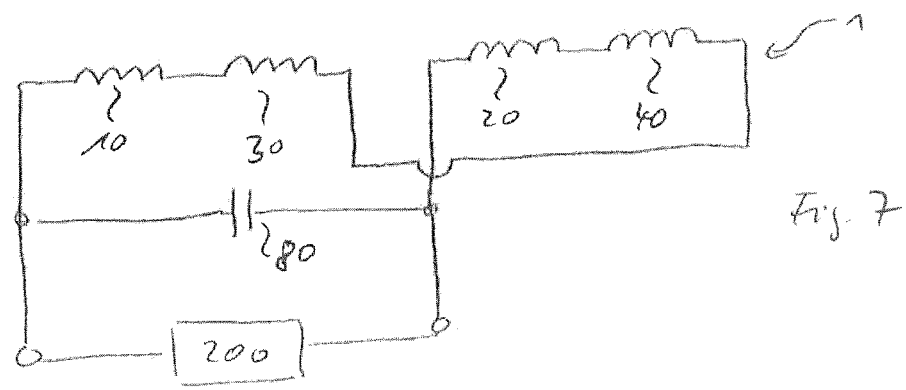
FIG. 7 schematically shows a sensor device according to an exemplary embodiment.

FIG. 7 shows another alternative example in which one capacitance arrangement 80 is connected in parallel to all coils 10, 30, 20, 40, for example by interconnecting the connection lines of the sensing arrangement and thus being connected in parallel to the driving unit 200.

Figures 8, 9, 10:
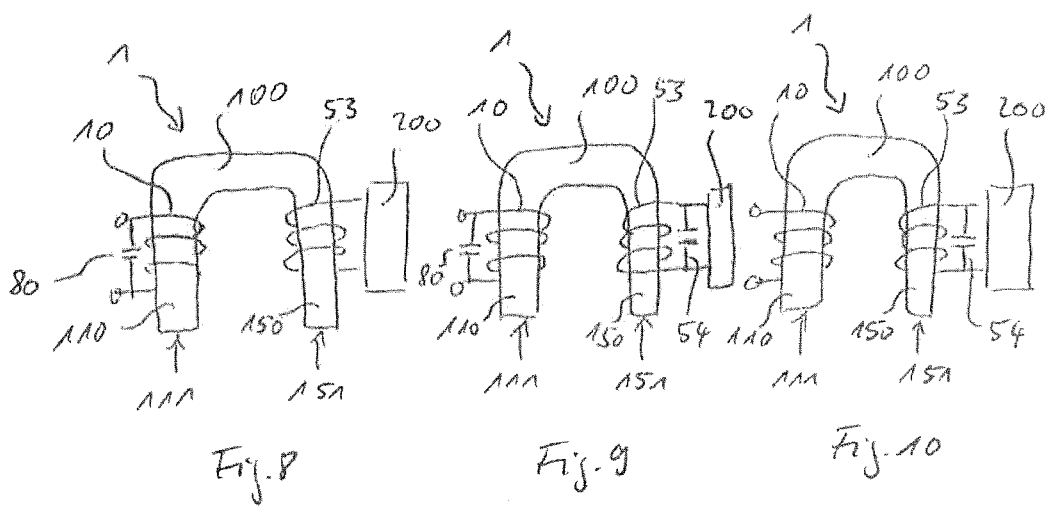
FIG. 8 schematically shows a sensor device according to an exemplary embodiment.
FIG. 9 schematically shows a sensor device according to an exemplary embodiment.
FIG. 10 schematically shows a sensor device according to an exemplary embodiment.

FIGS. 8 to 10 show several examples of how distance compensation of the sensor device can be achieved.

In each of the FIGS. 8 to 10, a sensor device 1 is shown comprising a flux concentrator 100, a generator coil 53 wound around leg 150 of the flux concentrator 100, a driving unit 200 connected to the generator coil 53 and adapted to provide the generator coil 53 with a signal for generating the magnetic field, a sensing coil 10 wound around leg 110 of the flux concentrator 100. The basic design of the sensor device is further described with reference to FIGS. 13 and 14.

One or more capacitances are used for distance compensation. In FIG. 8, capacitance 80 is connected in parallel to the sensing coil 10. In FIG. 9, additionally to capacitance 80 connected in parallel to sensing coil 10 there is a capacitance 54 connected in parallel to the generator coil 53. The slope of the resonance signal filter curve can be intensified or can be toned down by applying the resonance circuit techniques on both the generator coil and the sensor coil at the same time. In FIG. 10, there is only one capacitance 54 connected in parallel to the generator coil.

By building a resonance circuit (adding a capacitor $C_G$ to either one or both of the generator coil and the sensor coil)

the newly built $L_C$ circuit has become a band pass circuit. The center frequency of this band pass circuit is defined by the inductance value of Lc and capacitance value of $C_G$. The steepness of this band pass filter curve is defined by the Q-factor.

The capacitor $C_G$ and the inductor (coil) $L_G$ built a resonance circuit with a specific center frequency (example: 10 kHz). This center frequency may in particular correspond to the frequency of the AC signal used to generate the magnetic field with the generator coil.

Figure 13:
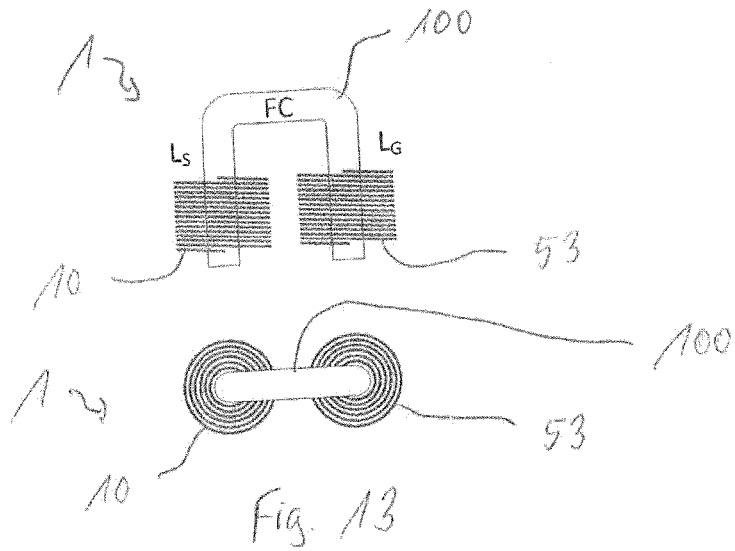
FIG. 13 schematically shows a sensor device according to an exemplary embodiment in a top view and front view.

FIG. 13 describes the basic design of a sensor device 1. The sensor device comprises a flux concentrator 100, a generator coil 53 and a sensing coil 10, each of which is wound around a respective leg of the flux concentrator 100. FIG. 13 shows a front view (upper drawing) and a top view (lower drawing) to the sensor device 1.

The basic design elements of an active sensing module are magnetic field generator coil 53 $L_G$, a flux concentrator 100 FC, and a magnetic field sensing device (like a coil 10 $L_S$). In the simplified example shown in FIG. 13 the magnetic field generator coil $L_G$ is placed onto the flux concentrator, and so is the magnetic field sensing coil $L_S$.

In this example, an inductor (coil $L_S$) is used to detect and measure the magnetic field strength. Alternatively, the design can be changed in such way that other magnetic field sensing devices can be used, like a Hall Effect Sensor, MR or GMR, for example. The two pole-ends (end faces of the legs) of the flux concentrator will be brought close to the surface of a ferromagnetic test object (from where the measurements will be taken from). When an electric current is running through the magnetic field generator coil (AC or DC) then a large portion of the generated magnetic field will be guided by the flux concentrator to the pole ends of the flux concentrator. Preferably, the here proposed distance compensation solution is implemented in that the magnetic field generating coil is powered by an alternating electric current (AC driver signal).

Figure 14:
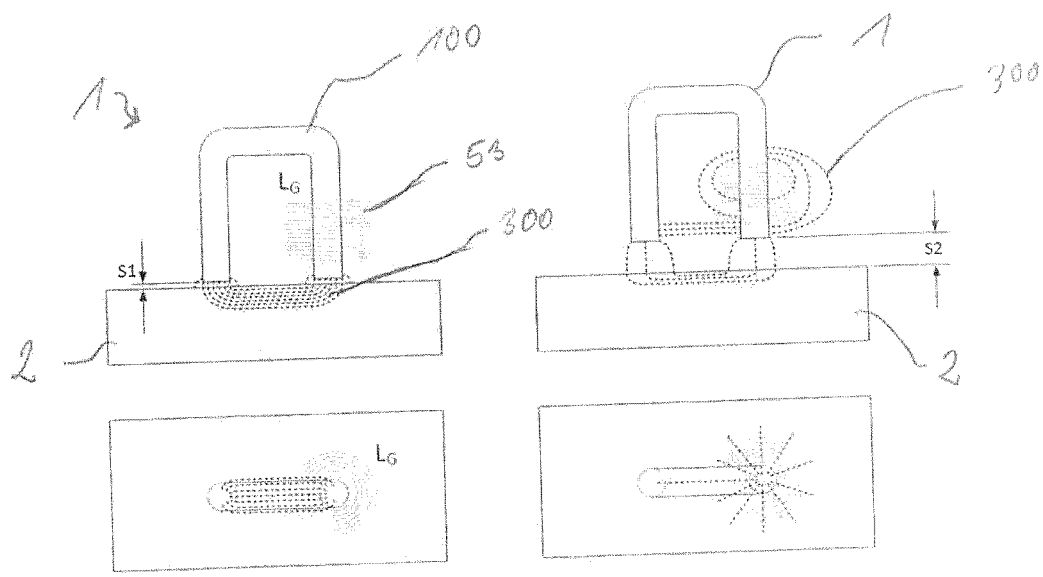
FIG. 14 schematically shows a sensor device according to an exemplary embodiment together with a test object in a top view and front view.

FIG. 14 schematically shows the consequences of varying the distance between the sensor device 1 and the test object 2, in particular between the end faces of the flux concentrator 100 and the surface of the test object 2. For this purpose, two different distances or gaps S1 and S2 between the end faces of the flux concentrator's legs and the test surface are shown on the left and the right of FIG. 14, respectively. On the left, distance S1 is smaller than distance S2 shown on the right. As can be derived from the respective drawings, there is some stray of the magnetic flux 300 on the right while on the left, all or almost all of the magnetic flux lines run from one leg of the flux concentrator to the other leg through the test object.

When the distance S is changing (between the pole ends of the flux concentrator and the ferromagnetic test object) then this will influence the physical path the magnetic flux 300 is taking around the magnetic field generating inductor $L_G$. In addition, the effective permeability of the entire arrangement (generator coil, flux concentrator, test object, gap between flux concentrator and test object, sensing coil) will change and with this will define the inductivity of the magnetic field generating coil.

The distance S1 and S2 (air-gap or spacing) between the end faces and the test object surface are now affecting how much of the available generated magnetic field will run inside of the test object. For best sensor efficiency (meaning: lower power consumption) and/or best signal measurement the distance (air-gap) has to be as small as possible.

The effective permeability (that is acting on the indictor $L_G$) of the combination flux concentrator and the ferromagnetic test object is at its highest when the air-gap is as small as possible, see FIG. 14, where the configuration shown on the left is generally preferred over the configuration shown on the right due to S1<S2. On the contrary, the effective permeability (that is acting on the inductor $L_G$) of the combination flux concentrator and test object is at is possible lowest value when the air gap is as large as possible.

In other words, the effective inductivity of the magnetic field generating coil is changing with the air gap (spacing or distance) between the flux concentrator and the ferromagnetic test object.

Figure 11:
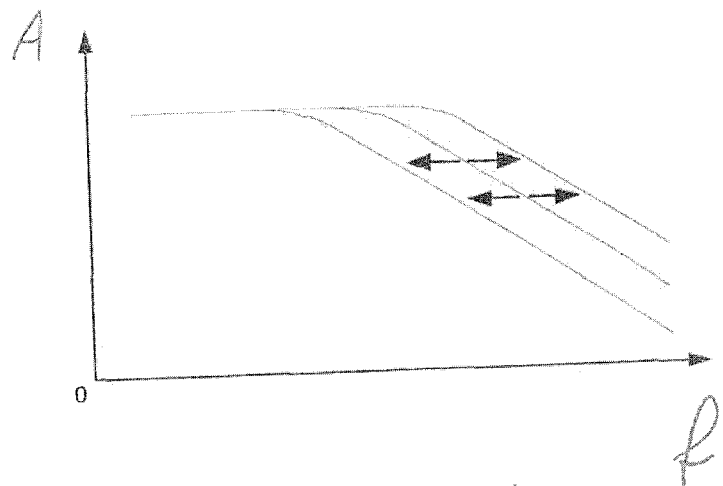
FIG. 11 schematically shows filter characteristics of a sensor device.

FIG. 11 shows the low-pass filter characteristics of the magnetic field generating inductor $L_G$ and how the characteristics are changing when changing the air gap (between the end faces of the flux concentrator and the test object, see FIG. 14 for more details).

Reduction of the air gap reduces the signal amplitude A at high frequencies f while increasing the air gap has an effect to the contrary.

Figure 12:
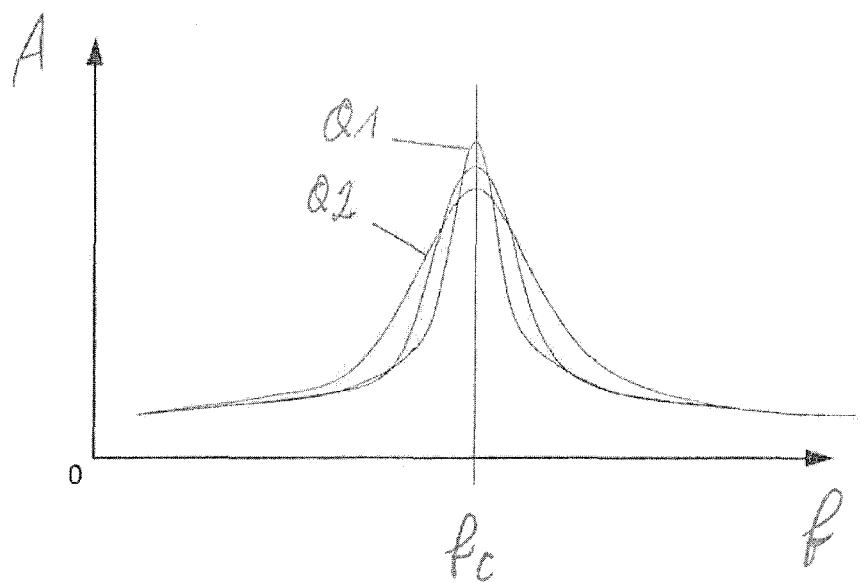
FIG. 12 schematically shows filter characteristics of an L-C-resonance circuit according to an exemplary embodiment.

FIG. 12 schematically shows different signal amplitudes A over the frequency f. The steepness of the filter characteristics of the $L_G C_G$ resonance circuit is defined by the Q-factor. A high Q-factor Q1 increases the steepness of the filter curve. A low Q-factor Q2 (Q2<Q1) value will reduce the slopes of the band pass filter curve.

The inductivity of the magnetic field generator is defined by the specification of the coil, the permeability of the flux concentrator, the permeability of the test object, and by the air-pap S between the flux concentrator and the surface of the ferromagnetic test object. Changing the air-gap will change the inductivity value of $L_G$ and with this the resonance frequency of the LC circuit.

As described above, increasing the air gap will result in decreasing the inductivity of $L_G$, while reducing the air gap will increase the inductivity of $L_G$. This will have an effect on the center frequency of the resonance circuit $L_G C_G$.

Figure 15:
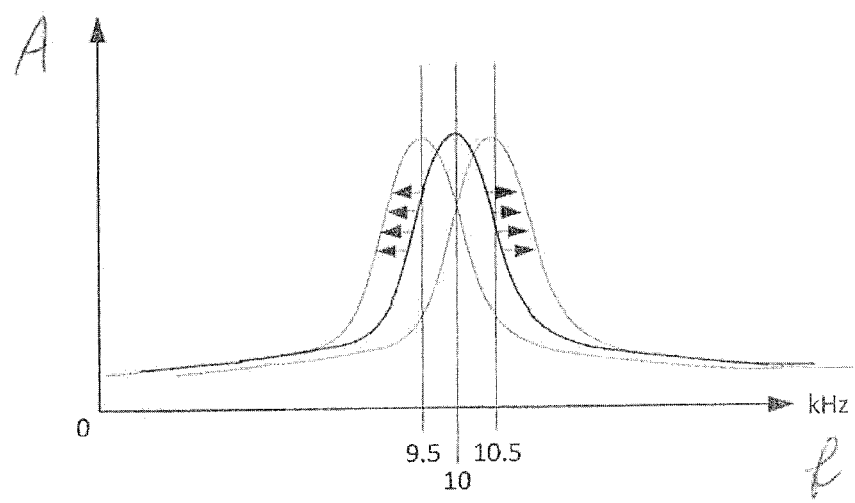
FIG. 15 schematically shows the influence of the distance between the test object and the sensor device on the resonance frequency of the sensor device according to an exemplary embodiment.

The effect of the air gap's size on the inductivity (thus on the Q-factor, thus on the signal amplitude A of the sensed signal) is shown in FIG. 15. The filter characteristics of the resonance circuit $L_G C_G$ will change with the air gap changes (between the flux concentrator and ferromagnetic test object). When the air-gap is getting larger the center frequency of the resonance circuit is increasing and will shift the signal curve with the center frequency of 10 kHz to the right to a center frequency of 10.5 kHz.

Similarly, when the air gap is reduced, the signal curve is shifted to the left to a center frequency of 9.5 kHz. It should be understood that these frequency values are of exemplary nature only and do not limit the possible frequency values.

Figure 16:
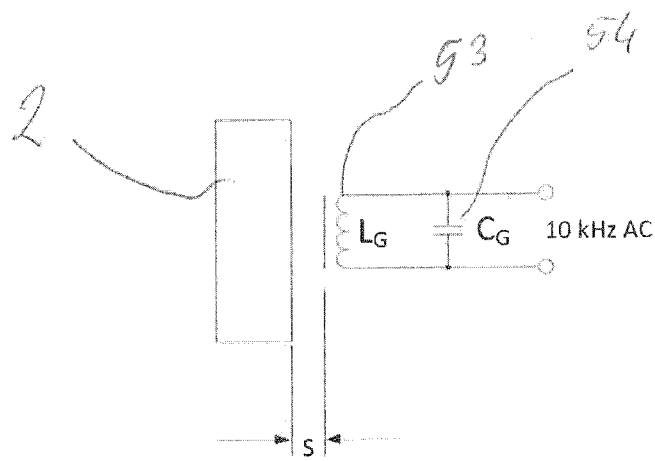
FIG. 16 schematically shows a sensor device according to an exemplary embodiment together with a test object.

FIG. 16 shows a coil 53 of the magnetic field generator connected in parallel to the capacitance 54 and thus building a LC resonance circuit. This resonance circuit is driven by an AC signal of 10 kHz, which preferably is a fixed alternating current of 10 kHz which may be called carrier frequency. The magnetic field strength emitted (generated) by the inductor $L_G$ is influenced by the center frequency of the resonance circuit $L_G C_G$. The center frequency of the resonance circuit is also influenced by the distance S between the generator coil 53 and/or the flux concentrator and the test object 2.

Figure 17:
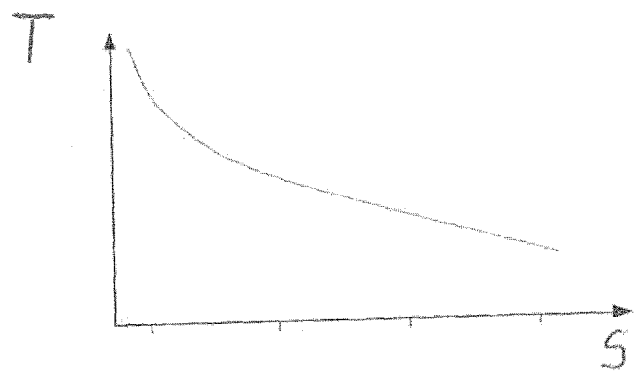
FIG. 17 schematically shows the magnetic field intensity measured by a sensor device depending on the distance to the test object.

FIG. 17 schematically shows the magnetic field intensity T that effectively penetrates the test object surface depending on the gap size S.

A large portion of the generated magnetic field (generated by $L_G$) will penetrate the surface of the test object. However, the amount of the magnetic field that will reach the test object surface will be influenced by the distance (air-gap) S between these two objects. When increasing the distance, the amount of magnetic field that is reaching the test object will generally decrease, see also FIG. 14 for graphic representation of stray losses with increasing S.

The curve shown in FIG. 17 schematically shows the respective curve. When the end faces of the flux concentrator (with the magnetic field generator coil $L_G$ placed onto the flux concentrator) is increasing its distance (air-gap) to the surface of the test object, then the effective magnetic field intensity at the surface of the test object will decrease. This will affect the measurement performance of the sensor device and is what will be compensated by the capacitance arrangement.

This compensation can be done by either one of the basic options shown and described with reference to FIGS. 8 to 10. It should be noted that these options are similar in respect of their effect and are built up in a similar manner, namely by providing a capacitance which forms an LC resonance circuit with either one or both of the generator coil and one or more sensing coils in order to affect the resonance frequency of said LC resonance circuit.

Further to FIG. 17, when the air-gap is increasing, then the magnetic field intensity that is generated by the magnetic field generator coil ($L_G$) can be increased and/or the sensitivity of the Magnetic Field Sensing coil ($L_S$) can be increased in order to compensate the effect of the increased gab. These options can be applied each on its own (see FIG. 8 and FIG. 10), or can be applied in conjunction (together) at the same time (see FIG. 9).

Figure 18:
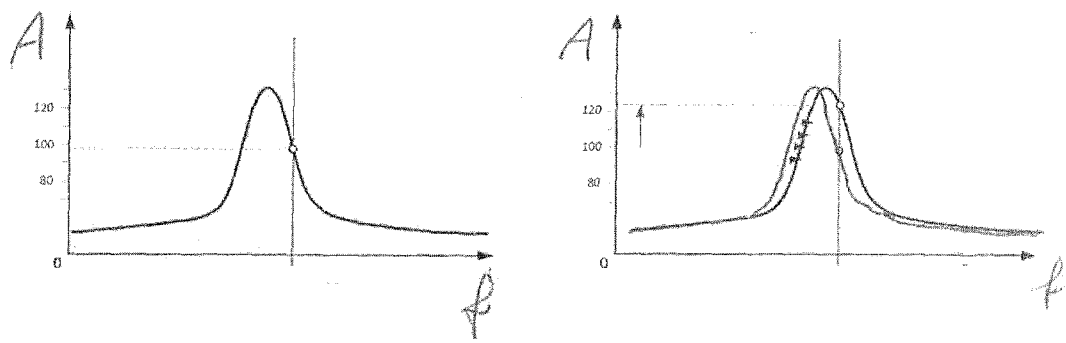
FIG. 18 schematically shows filter characteristics of a sensor device according to an exemplary embodiment.

With reference to FIG. 18 distance compensation by adding a capacitance to the magnetic field generating coil is described.

By setting the center frequency of the resonance circuit (of the magnetic field generator) $L_G C_G$ to be slightly lower (see left diagram in which the signal curve has a slight offset to the left with respect to the center frequency indicated by the vertical line) than the enforced or desired carrier frequency (vertical line in both diagrams of FIG. 18, in this example: 10 kHz), the generated magnetic field strength will increase when the spacing to the test object will increase. This means that when the air-gap is increasing then the magnetic field strength output of the sensing module will increase as well, and with this compensate for the losses caused by the larger air-gap.

In other words, as the air-gap is increasing, the center frequency of the resonance circuit $L_G C_G$ will increase, too. By placing the center frequency at 9.5 kHz (see left diagram in FIG. 18, signal curve when the air-gap is as its smallest), the center frequency of the resonance circuit will move towards the fixed 10 kHz generator driver frequency (10 kHz) and with this allows that more magnetic field will be generated. This state is shown in the right diagram of FIG. 18. The shifted signal curve is offset to the right with respect to the original signal curve. The sensor device described herein will create a magnetic field having an increase intensity when the air-gap will increase. This may apply to a limited range of air gap size changes.

With the value of the resonance specification of the Q-factor the filter curve slope can be altered to adapt to application specific compensation needs.

Figure 19:
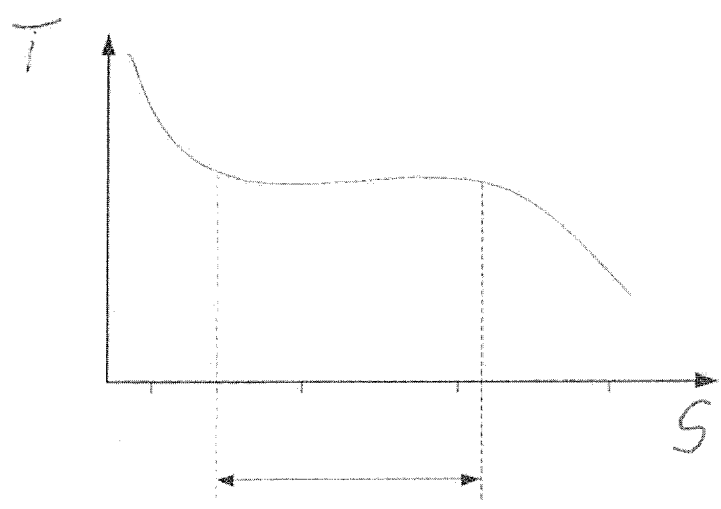
FIG. 19 schematically shows the magnetic field intensity measured by a sensor device according to an exemplary embodiment depending on the distance to the test object.

FIG. 19 schematically shows the magnetic field intensity T that effectively penetrates the test object surface over the gap size S when using the compensation approach described herein.

For a specific sensor design the distance compensation curve looks as shown in FIG. 19. In this specific example a distance range between the two vertical dashed lines is now insensitive to air-gap changes as the magnetic field intensity T is almost constant in this region. In other words, even though the distance between the flux concentrator and the test object changes, the magnetic field intensity will remain substantially constant. Depending on the physical dimensions of the Sensing Module (with the flux concentrator, inductor $L_G$, and inductor $L_S$ inside), the chosen values for the coils $L_G$ and $L_S$ and the resulting values of the Q-factor, the effective distance compensation range can be defined and may go well over 1 mm, for example.

In the following, additional examples are provided with reference to the general description above and the figures.

EXAMPLE 1

Sensor device for sensing a torque being applied to an object, the sensor device comprises:
a first inductance arrangement (1030) having a first coil (10) with a corresponding main sensing direction (15);
a second inductance arrangement (2040) having a second coil (20) with a corresponding main sensing direction (25);
a capacitance arrangement (80);
wherein first inductance arrangement (1030) and the second inductance arrangement (2040) are connected;
wherein the capacitance arrangement (80) together with the first inductance arrangement (1030) and the second inductance arrangement (2040) forms at least one resonant circuit having a corresponding resonance frequency;
wherein the first coil (10) and the second coil (20) are oriented so as to have the corresponding main magnetizing directions (15, 25) oriented toward an object to be sensed;
wherein the first coil (10) and the second coil (20) with respect to the corresponding main sensing directions (15, 25) are connected in anti-series, in particular such that in a homogenous magnetic field applied to the first coil (10) and the second coil (20) results in an at least partially compensation of signals at the first coil and the second coil, leading to a resulting signal over the first inductance arrangement and the second inductance arrangement.

EXAMPLE 2

Sensor device according to example 1, wherein the first inductance arrangement (1030) and the second inductance arrangement (2040) are dimensioned with respect to each other so that in a torque versus signal strength characteristic, at a zero torque applied to the object a signal strength of the resulting signal is shifted with respect to a minimum signal strength, so as to be capable of sensing a direction of the applied torque.

EXAMPLE 3

Sensor device according to any one of examples 1 and 2, further comprising a magnetic field generator (50) being capable of generating a magnetic flux in the object to be sensed, such that a variation of the torque applied to the object results in a variation of the signal strength of a signal over the first inductance arrangement (1030) and the second inductance arrangement (2040).

EXAMPLE 4

Sensor device according to any one of examples 1 to 3, further comprising a flux concentrator (100) with a first leg (110) and a second leg (120), wherein the first coil (10) is wound around the first leg and the second coil (20) is wound around the second leg.

EXAMPLE 5

Sensor device according to any one of examples 1 to 4, wherein the first inductance arrangement (1030) further has a third coil (30) with a corresponding main sensing direction (35); wherein the second inductance arrangement (2040) further has a fourth coil (40) with a corresponding main sensing direction (45); wherein the third coil (30) and the fourth coil (40) are oriented so as to have the respective main magnetizing directions (35, 45) oriented toward an object to be sensed; wherein the first coil (10) and the third coil (30) are connected in series and the second coil (20) and the fourth coil (40) are connected in series; wherein the series connection of the first coil (10) and the third coil (30) with respect to their main sensing directions (15, 35) are connected in anti-series to the series connection of the second coil (20) and the fourth coil (40) with respect to their main sensing directions (25, 45), in particular such that in a homogenous magnetic field applied to the first coil (10), the second coil (20), the third coil (30) and the fourth coil (40) results in an at least partially compensation of signals at the first coil, the second coil, the third coil and the fourth coil, leading to a resulting signal over the first inductance arrangement and the second inductance arrangement.

EXAMPLE 6

Sensor device according to example 5, wherein the flux concentrator (100) has a third leg (130) and a fourth leg (140), wherein the third coil (30) is wound around the third leg (130) and the fourth coil (40) is wound around the fourth leg (140).

Example 7

Sensor device according to example 6, wherein the first leg (110), the second leg (120), the third leg (130) and the fourth leg (140) are arranged at corners of a rectangle, in particular a square, with respective end faces (111, 121, 131, 141) of the legs (110, 120, 130, 140) oriented toward the object to be sensed.

EXAMPLE 8

Sensor device according to any one of examples 4 to 7, wherein the flux concentrator (100) has a fifth leg (150), wherein the magnetic field generator is an inductance coil (50) wound around the fifth leg (150).

EXAMPLE 9

Sensor device according to example 8, wherein the fifth leg (150) is arranged in the center of the rectangle, in particular the square, with a respective end face (151) of the fifth leg (150) oriented toward the object to be sensed.

EXAMPLE 10

Sensor device according to any one of examples 1 to 9, further comprising a driving unit (200) being connectable to the magnetic field generator (50), wherein the driving unit is adapted to drive the magnetic field generator with an operation frequency being shifted with respect to the resonance frequency of the resonance circuit formed by the first inductance arrangement, the second inductance arrangement and the capacitance arrangement at a predefined distance between the sensor device and the object to be sensed.

EXAMPLE 11

Sensor device according to example 10, wherein the shift of the operation frequency of the driving unit (200) with respect to the resonance frequency is set up, such that when varying the distance between the sensor device (1) and the object (2), a change of the resulting signal due to a changed distance is compensated by a change of the resulting signal due to a change of the resonance frequency.

EXAMPLE 12

Sensor device according to any one of examples 10 and 11, wherein the shift of the of the operation frequency of the driving unit (200) with respect to the resonance frequency is set up, such that for a predetermined distance variation range the bending characteristic of the resonance frequency characteristic corresponds to the bending characteristic of the distance versus signal strength characteristic, wherein a required amplification factor for compensation is set up by varying the quality factor of the resonance circuit.

EXAMPLE 13

Sensor device according to any one of examples 1 to 12, wherein the capacitance arrangement (80) comprises a single capacitance being connected in parallel to a series or anti-series connection of the first inductance arrangement (1030) and the second inductance arrangement (2040), thus forming the at least one resonant circuit having the corresponding resonance frequency.

EXAMPLE 14

Sensor device according to any one of examples 1 to 12, wherein the capacitance arrangement (80) comprises a first capacitance (81) and a second capacitance (82), wherein the first, capacitance (81) together with the first inductance arrangement (1030) forms a first resonance circuit and the second capacitance (82) together with the second inductance arrangement (2040) forms a second resonance circuit, resulting a in a resonance characteristic having a dominant frequency as the resonance frequency.

EXAMPLE 15

Sensor device according to any one of examples 5 to 12, wherein the capacitance arrangement (80) comprises a first capacitance (81) and a second capacitance (82), a third capacitance (83) and a fourth capacitance (84), wherein the first capacitance (81) together with the first coil (10) forms a first resonance circuit, the second capacitance (82) together with the second coil (20) forms a second resonance circuit, the third capacitance (83) together with the third coil (30) forms a third resonance circuit, and the fourth capacitance (84) together with the fourth coil (40) forms a fourth resonance circuit, resulting a in a resonance characteristic having a dominant frequency as the resonance frequency.

LIST OF REFERENCE SIGNS

1 sensor device
2 object to be sensed 10 first coil
15 main sensing direction of first coil
20 second coil
25 main sensing direction of second coil
30 third coil
35 main sensing direction of third coil
40 fourth coil
45 main sensing direction of fourth coil
50 magnetic field generator
53 coil of magnetic field generator
54 capacitance of magnetic field generator
55 main generator magnetic field direction of generator coil
80 capacitance arrangement
81 first capacitance
82 second capacitance
83 third capacitance
84 fourth capacitance
100 flux concentrator
110 first leg of flux concentrator
111 end face of first leg
120 second leg of flux concentrator
121 end face of second leg
130 third leg of flux concentrator
131 end face of third leg
140 fourth leg of flux concentrator
141 end face of fourth leg
150 fifth leg of flux concentrator
151 end face of fifth leg
200 driving unit
300 magnetic flux lines
1030 first inductance arrangement
2040 a second inductance arrangement

The invention claimed is:

1. A sensor device for sensing a torque being applied to an object to be sensed, comprising:
a first inductance arrangement having a first coil with a corresponding main sensing direction; and
a magnetic field generator configured to generate a magnetic flux in the object, such that a variation of the torque applied to the object results in a variation of a signal strength of a signal over the first inductance arrangement,
a driving unit connected to the magnetic field generator,
wherein the first coil is oriented so as to have corresponding main magnetizing directions oriented toward the object,
wherein the magnetic field generator comprises a coil and a capacitance, the capacitance and the coil of the magnetic field generator forming a resonant circuit having a corresponding resonance frequency,
wherein the driving unit is adapted to drive the magnetic field generator with an operation frequency being shifted with respect to the resonance frequency of the resonance circuit formed by the coil and the capacitance of the magnetic field generator at a predefined distance between the sensor device and the object,
wherein a center frequency of the resonance circuit formed by the coil and the capacitance of the magnetic field generator is lower than the operation frequency of the driving unit, and
wherein the driving unit is adapted to drive the magnetic field generator so that an intensity of a magnetic field generated by the magnetic field generator increases when an air-gap between the sensor device and the object increases.

2. The sensor device of claim 1, further comprising:
a flux concentrator with a first leg and a second leg,
wherein the first coil is wound around the first leg and the coil of the magnetic field generator is wound around the second leg.

3. The sensor device of claim 1, wherein the shift of the operation frequency of the driving unit with respect to the resonance frequency is set up, such that when varying the distance between the sensor device and the object, a change of a resulting signal due to a changed distance over the predefined distance between the sensor device and the object to be sensed is compensated by a change of the resulting signal due to a change of the resonance frequency.

4. The sensor device of claim 1, wherein the shift of the operation frequency of the driving unit with respect to the resonance frequency is set up, such that for a predetermined distance variation range a bending characteristic of a resonance frequency characteristic corresponds to a bending characteristic of a distance versus signal strength characteristic, and wherein a required amplification factor for compensation is set up by varying a quality factor of the resonance circuit.

5. A sensing system, comprising:
an object to be sensed; and
a sensor device sensing a torque being applied to the object;
wherein the sensor device comprises:
a first inductance arrangement having a first coil with a corresponding main sensing direction,
a magnetic field generator configured to generate a magnetic flux in the object, such that a variation of the torque applied to the object results in a variation of a signal strength of a signal over the first inductance arrangement, and
a driving unit connected to the magnetic field generator,
wherein the first coil is oriented so as to have corresponding main magnetizing directions oriented toward the object,
wherein the magnetic field generator comprises a coil and a capacitance, the capacitance and the coil of the magnetic field generator forming a resonant circuit having a corresponding resonance frequency,
wherein the driving unit is adapted to drive the magnetic field generator with an operation frequency being shifted with respect to the resonance frequency of the resonance circuit formed by the coil and the capacitance of the magnetic field generator at a predefined distance between the sensor device and the object,
wherein a center frequency of the resonance circuit formed by the coil and the capacitance of the magnetic field generator is lower than the operation frequency of the driving unit, and
wherein the driving unit is adapted to drive the magnetic field generator so that an intensity of a magnetic field generated by the magnetic field generator increases when an air-gap between the sensor device and the object increases.

* * * * *